Aug. 15, 1967   R. W. LARSON   3,335,886

RACK STRUCTURE FOR TREE HARVESTING APPARATUS

Original Filed Oct. 29, 1963    4 Sheets-Sheet 1

INVENTOR.
Robert W. Larson
BY
Meyers & Peterson
ATTORNEYS

Aug. 15, 1967 R. W. LARSON 3,335,886
RACK STRUCTURE FOR TREE HARVESTING APPARATUS
Original Filed Oct. 29, 1963
4 Sheets-Sheet 2
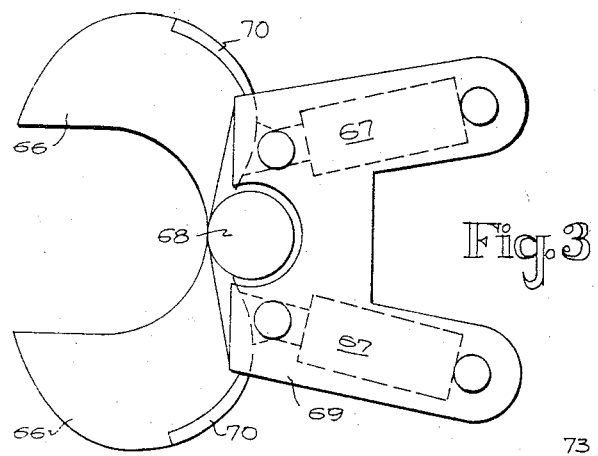
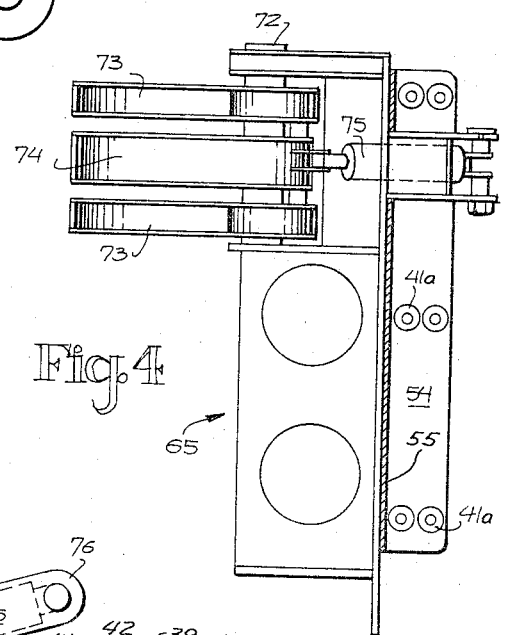
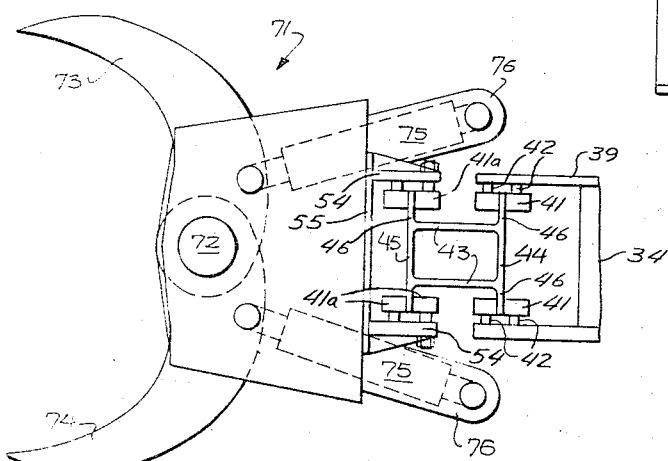
INVENTOR.
Robert W. Larson
BY
Meyers & Peterson
ATTORNEYS INVENTOR.
Robert W. Larson
BY Meyers & Peterson
ATTORNEYS Aug. 15, 1967    R. W. LARSON    3,335,886
RACK STRUCTURE FOR TREE HARVESTING APPARATUS
Original Filed Oct. 29, 1963    4 Sheets-Sheet 4

INVENTOR.
Robert W. Larson
BY Meyers & Peterson
ATTORNEYS

United States Patent Office 3,335,886
Patented Aug. 15, 1967

3,335,886
RACK STRUCTURE FOR TREE HARVESTING APPARATUS
Robert W. Larson, Fort William, Ontario, Canada, assignor to Beloit Corporation, a corporation of Wisconsin
Original application Oct. 29, 1963, Ser. No. 319,816, now Patent No. 3,277,936, dated Oct. 11, 1966. Divided and this application June 2, 1966, Ser. No. 554,871
10 Claims. (Cl. 214—502)

This application is a division of my copending application, Ser. No. 319,816, filed Oct. 29, 1963, now Patent No. 3,277,936, and entitled, "Tree Harvesting Apparatus."

One object of this invention is to provide a rack structure adapted for use on a tree harvesting vehicle or the like used in selective logging operations.

Another object of the invention is to provide a tree-retaining rack structure for a skidding vehicle adapted to transport a plurality of cut trees from one location to another in a forest.

Still another object of the invention is to provide a rack structure for use on tree harvesting vehicles, the rack being adapted to be easily loaded and unloaded and further being adapted to securely retain one end of each of a plurality of cut trees without chains or clamps or other encircling apparatus.

Other objects, advantages and new features of this invention will become apparent from a consideration of the following detailed description when read in conjunction with the accompanying drawings wherein:

FIGURES 3 through 5 are fragmentary detailed views partly in section of several elements of the tree harvesting and rack loading elements of the apparatus of FIGURE 1;

Figure 1:
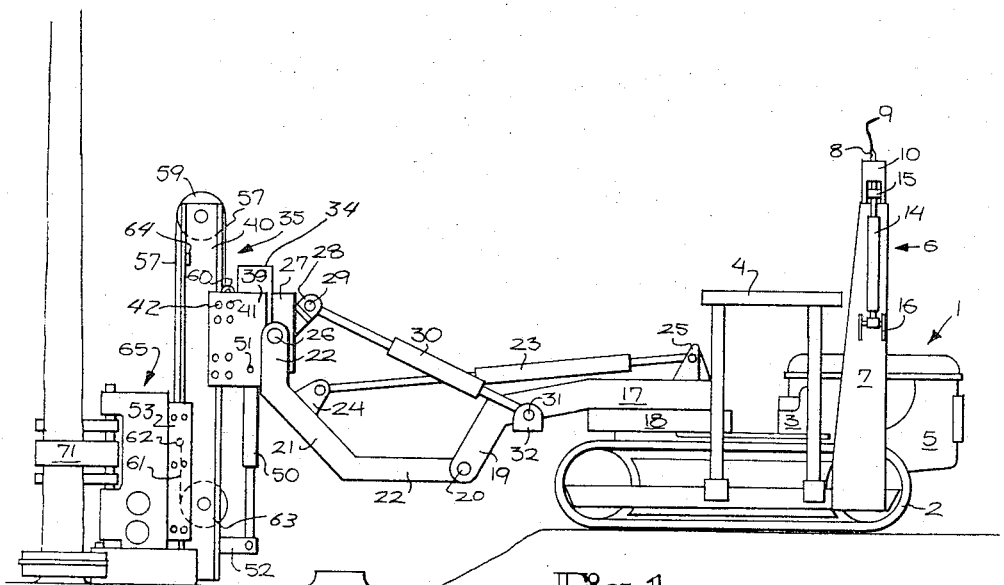
FIGURE 1 is a side elevational view of a logging apparatus having a rack in accordance with the present invention.

Referring to the drawings, a mobile vehicle incorporating the apparatus of this invention is indicated generally by the numeral 1 and may comprise any mobile vehicle such as a crawler tractor having endless treads 2, a cab 3 provided with a protective canopy 4 and an engine 5 for propelling the vehicle and for providing power for operating various mechanism to be hereinafter described.

Figure 2:
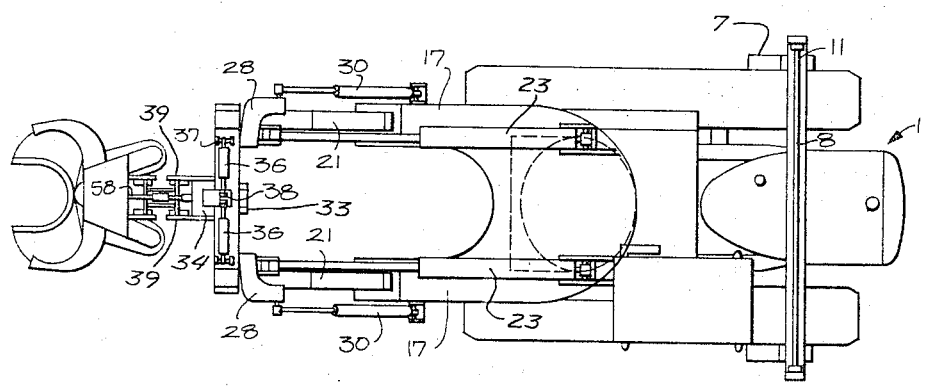
FIGURE 2 is a top plan view of the apparatus shown in FIGURE 1.
Figure 8:
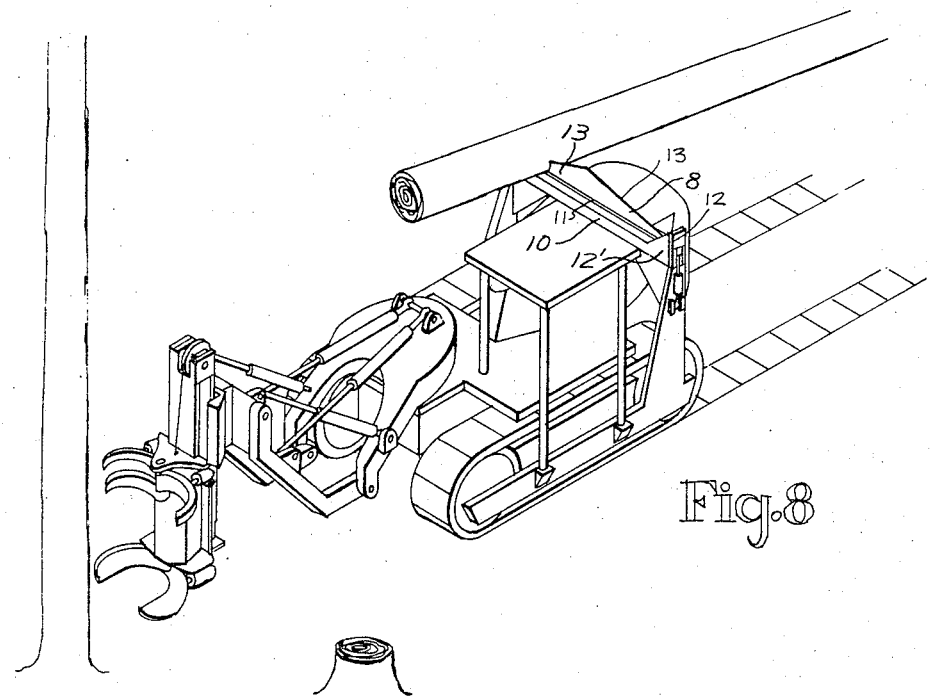
FIGURE 8 is a perspective view of the apparatus shown in the preceding figures.

Mounted at the rear of the vehicle is a rack assembly 6 which comprises a pair of supporting uprights or standards 7 which are secured to each side of the vehicle. The rack assembly also includes a knife blade 8 which is fixedly mounted on the uprights 7 and is provided with a cutting chisel or knife edge 9. Mounted for vertical movement with respect to the uprights 7 is a cradle frame 10 provided with a kerf or slot 11 (see FIGURES 2 and 8) which slidably receives the knife blade 8 for relative sliding movement therein. The cradle frame 10 is adapted to laterally confine a plurality of cut trees deposited on the rack by means of vertical upright portions 12, the knife blade 8 having downwardly inclined surfaces 13, FIGURE 8, so that trees will slide by gravity toward the portions 12 as will appear more fully below. Upright portions 12 are provided with angled inner surfaces 12' to facilitate unloading of trees piled on the rack. Relative movement between the knife blade 8 and the cradle frame 10 is effected by means of a pair of double-acting hydraulic cylinder-piston units 14 which are pivotally connected about a shaft 15 at each lateral end of the cradle frame 10 and to a pair of lugs 16 provided on the uprights 7. It is noted that during loading operations, the cradle frame 10 will be lowered so that the chisel edge 9 of the blade means 8 will be projected upwardly and within the cradle frame 10. Thus as trees are loaded on the rack structure, the knife edge of the blade will cut into the trunk providing a convenient means for retaining the heel or butt ends of the trees on the rack structure during forward movement of the vehicle to the next site of operation or unloading, the opposite ends of the trees resting on the ground. Also as will be appreciated, the projecting uprights 12 of the cradle frame serve to laterally confine the trees on the rack during loading and transporting of the trees.

In operation, the first tree loaded on the rack assembly will slide down the inclined surfaces 13 to the outside of the rack, against the upright projections 12, by gravity, leaving the center of the rack clear for the next tree. As will be appreciated, the rack may be of any dimension desired for the number of trees to be harvested, and conversely the dimension of the rack determines the number of trees to be loaded thereon. For example in a unit having a rack adapted for a capacity of six trees, if the operator should get only two or three trees at one site or location, he can skid his accumulated load to the next group of trees where he can then continue to fill the rack. After the rack is filled, the operator can dump the rack thus forming a bunch, or transport the load of trees to a collecting station. Unloading of the rack is accomplished by means of the hydraulic cylinder-piston units 14, one or both of which may be extended to raise the cradle frame 10 above the blade means 8 which becomes retracted within the slot 11 and which action withdraws the chisel or knife edge from the trees leaving them solely supported on the cradle frame 10. When both of the hydraulic cylinder-piston units 14 are extended to elevate the cradle frame, the operator may then selectively retract one of the cylinder-piston units, at the side of the tractor at which the trees are to be unloaded, thereby tilting the cradle frame 10 toward the selected side and cause the trees to slide thereoff by gravity over the angled inner surfaces 12' of the upright projections 12. As will be appreciated, the angle of the surfaces 12' is correlated to the degree of tilt to be imparted to the cradle frame so that when the cradle frame is tilted, the slanted faces 12' will be inclined downwardly toward the depositing surfaces for the trees. Thus where the angle of tilt given the cradle frame 10 is 50°, the angle of the slanted surface will be less, as for example 45°. Alternatively, if desired, only one of the hydraulic cylinder-piston units 14 may be actuated for unloading of the trees, with the cylinder unit at the side at which the trees are loaded being kept in a retracted position.

Mounted at the forward portion of the vehicle is a shear-clamping mechanism for cutting and gripping standing trees and which is adapted to tilt the tree over onto the aforesaid rack. This assembly includes a boom support means consisting of a yoke unit 17 rotatably mounted at one end, the shank end, to a turntable 18 which adapts the yoke for rotational movement about a vertical axis, the turntable 18 being connected to engine 5 in any suitable manner for controlled rotation of the yoke. The bifurcated arms 19 on yoke unit 17 each have pivotally mounted at their distal ends, about a shaft 20, a boom element 21. In the form illustrated, each of the boom elements 21 has angular divergent end portions 22 to facilitate the compactness of the apparatus. Each of the boom elements 21 are actuated in vertical movement about the horizontal axis defined by the shafts 20 by means of one of a pair of hydraulic cylinder-piston units 23 which may be powered from the engine 5 of the vehicle as indicated above, and which are pivotally connected between lugs 24 provided on boom elements 21 and to brackets 25 provided on the yoke 17.

Pivotally mounted about a shaft 26 is a backing plate 27 which is provided at each side thereof (FIGURE 2) with a bracket 28 to which is pivotally mounted, about a shaft 29, one end of a hydraulic cylinder-piston unit 30 with its other end mounted to a shaft 31 disposed within a bracket 32 which is provided on each of the bifurcated arms 19 of yoke 17. As will be appreciated, extension and retraction of the hydraulic units 30 actuates the backing plate 27 in angular movement about the horizontal axis defined by shaft 26. Rotationally supported on backing plate 27 about a shaft 33 is a mast support base 34 of a mast support assembly 35 with the axis of shaft 33 disposed normally to the axis defined by shaft 26 mounted at the distal end of the boom elements 21. Rotational movement of the mast support base 34 is accomplished by means of a pair of hydraulic cylinder-piston units 36 which are pivotally mounted between lugs 37 provided on the backing plate 27 and on studs projecting from the back of the mast support base 34.

The assembly 35 also includes a pair of side plates 39 depending from the mast support base 34 and provided in the forward portion thereof with suitable tracking guides for mounting thereon a mast 40 for vertical reciprocating movement therein. In the form shown the guide may comprise a plurality of spaced vertical rows of guide wheels 41 (as more fully shown in FIGURES 4 and 5) mounted about shafts 42, which adapt the mast support assembly 35 to function as a slide bed or block.

In the form illustrated the mast 40 is formed of a pair of side plates 43 (see FIGURE 5) which are secured to rear and forward wall sections 44 and 45, intermediate the lateral edges thereof, so as to form laterally projecting flanges 46, those flanges 46 on rear section 45 serving as tracking rails for engagement between the rows of guide wheels 41. Controllable movement of the mast 40 is accomplished by means of an extensible and retractable hydraulic cylinder-piston unit 50 which is pivotally mounted about suitable mounting means on side plates 39, as by means of a shaft 51, and to a bracket 52 provided adjacent the bottom of mast 40.

Slidably mounted on lateral flanges or tracks 46, of front wall section 45 of mast 40, is a slide frame 53 which is adapted to mount a pair of tree gripping means and tree cutting means thereon. Although the slide frame 53 may take many embodiments, in the particular form shown it comprises side plates 54 projecting from a base plate 55 with the side plates having mounted thereon rows of tracking wheels 41a which receive therein the slide flanges or tracks 46 of the front mast wall section 45. Reciprocal vertical movement of the slide frame 53 is effected by means of a cable 57 which is secured at one end to a suitable clevis 58 about a pin thereon, passed over a sheave 59 with the other end secured about a pin mounted in the clevis 60. As will be appreciated, retraction of hydraulic unit 50 to raise mast 40 will concurrently impart through the cable 57, upward movement to the slide frame 53 and associated mechanisms mounted thereon. The return and holding of the slide frame 53 at the bottom of mast 40 is effected by means of a cable 61 which is anchored at one end to a pin 62 on slide frame 53 and at the other end to a winder drum 63 which is biased to maintain cable 61 taut and under tension by spring drive or other suitable power means. In this manner when the slide frame 53 is at the top of the mast upon extension of hydraulic cylinder-piston unit 50 to lower the mast 40, the winder drum 63 winds the cable 61 under tension to return the slide frame to the bottom of the mast. To limit the vertical travel of the slide frame 53, suitable stop blocks 64 are provided on the mast at the desired travel limits of the slide frame on the mast.

Suitably secured by welding, bolts and the like, on the slide frame 53 is a head assembly 65 for mounting of a tree cutting and gripping mechanism. In the form shown, the tree cutting mechanism comprises a pair of shear blades 66 which are mounted on a pin 68 and are attached at the bottom of the head assembly 65. The shear blades 66 are actuated toward and away from each other for desired cutting action by means of extensible and retractable hydraulic cylinder-piston units 67 which are pivotally mounted between the blades 66 and to a suitable housing 69 which support the shears and hydraulic units, and in turn the housing is mounted to the head assembly 65. In the particular form shown, the shear blades 66 are provided with upstanding vertical side walls adapted to define a confining wall about the shears in their closed position. In this manner, these confining walls 70 serve to confine cut objects on the surface of the blades when they are in their closed position. Also provided on the head assembly 65, over and spaced from shears 66, is a tree gripping mechanism 71 which is pivotally mounted about a pivot pin 72 carried on suitable supporting structures at the top of the head assembly. The tree gripping mechanism 71 comprises opposed sets of jaws 73 and 74 which are actuated toward each other in clamping movement by means of hydraulic cylinder-piston units 75 which are pivotally connected to jaws 73 and 74 and to suitable brackets on the housing 76 provided on the head assembly 65.

Figure 6:
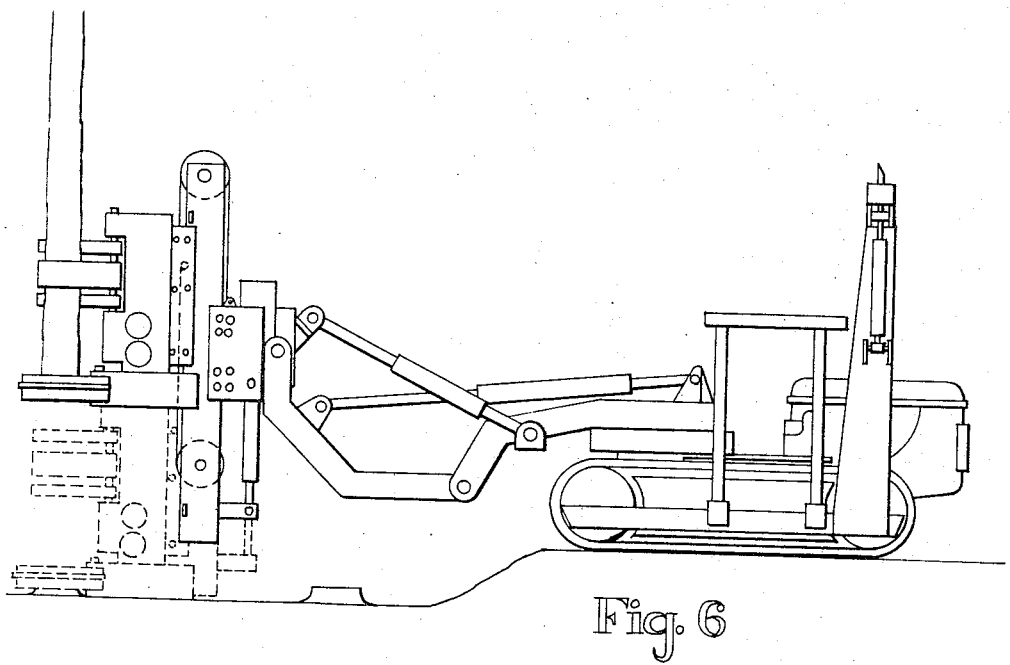
FIGURES 6 and 7 are side elevational views illustrating the operation of the apparatus of the preceding figures.

In operation, the operator sitting under the solid canopy 4 backs the machine into the working area to a clump of trees which are generally pre-selected and marked so as to enable him to make three to five cuts without moving the tractor. Thus by shearing the closest tree room is made for the next cut. With the machine positioned, the operator, if necessary, may rotate the yoke unit 17 about turntable 18 so as to bring the combined shear and tree gripping mechanism into position for working engagement with the tree to be harvested. It is noted that if necessary the operator may adjust the attitude of mast 40 for engagement with a tree, growing from the ground at a lateral angle to the machine, by adjustment of hydraulic units 36 which pivot the mast 40 about pivot pin 33. Similarly if the tree is growing from the ground at an angle toward the machine, the operator may control the attitude of mast 40 by retracting the hydraulic cylinder-piston unit 30 to the corresponding angle about pivot pin or shaft 26 which is carried at the distal end of boom 21. In like fashion the operator can also control the attitude of mast 40 for working conformation to a tree standing at an angle away from the machine. In a particular environment as shown in FIGURE 6, the machine is positioned for working engagement with a tree growing from a depression in the ground. For this working arrangement, the operator may extend the tree cutting-gripping mechanisms by extension of the hydraulic cylinder-piston unit 23 to bring the tree cutting and gripping mechanisms into working relationship with the tree to be harvested while simultaneously controlling the attitude of mast 40 by means of hydraulic cylinder-piston unit 30. With the tree cutting and gripping mechanisms positioned in working engagement about a standing tree, the operator will actuate hydraulic cylinder-piston unit 75 to close and clamp the jaws 73 and 74 about the tree for retention of the tree to the machine after a subsequent cutting operation. Thereafter, the operator will actuate the hydraulic cylinder-piston unit 67 to close the blades 66 in shearing action with one another to cut the tree at its base.

Figure 7:
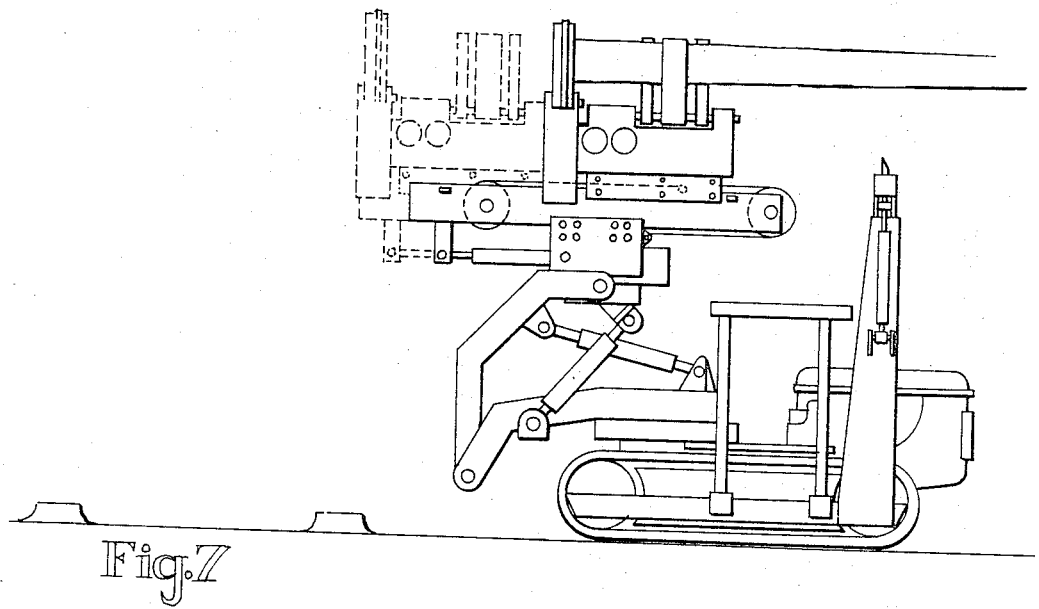

After the cutting operation the operator maintains the blade 66 in closed relationship to assist in supporting the tree on the top surfaces of the blades, with the upright confining walls 70 provided on the top surfaces of blades 66 forming, as indicated above, a retaining wall around the shears to prevent the tree from sliding off the top blade surfaces during subsequent handling and movement of the cut tree. With the tree clamped within the gripping mechanisms and supported on the top surfaces of shear blades 66, the tree is ready for loading on rack 6. For this purpose, the operator may extend the hydraulic cylinder-piston unit 50 to raise the mast 40, with concurrent raising of the head assembly 65 to prepare the tree for loading on the rack 6, as shown in FIGURE 6. In order to load the tree onto the rack, the operator may then retract the hydraulic cylinder-piston unit 23 to return the boom 21 while simultaneously controlling the attitude of the mast 40 by means of hydraulic cylinder-piston units 30 so as to tilt the mast 40 from a vertical to a substantially horizontal attitude as shown in FIGURE 7. With the tree in position over the rack 6, the operator will open the tree cutting and gripping mechanism to permit the tree to fall on the rack with the butt thereon supported on narrow blade 8 with the chisel thereof cutting into the tree to anchor therein and permit dragging of the tree to other positions for harvesting or to desired stations for subsequent processing. As indicated above, the angle sections of the chisel edge permit the tree to slide to the outside of the rack by gravity leaving the center clear for the next tree.

After the rack has been filled, the operator may hydraulically dump the rack, in the manner above described, at any desired station.

Figure 9:
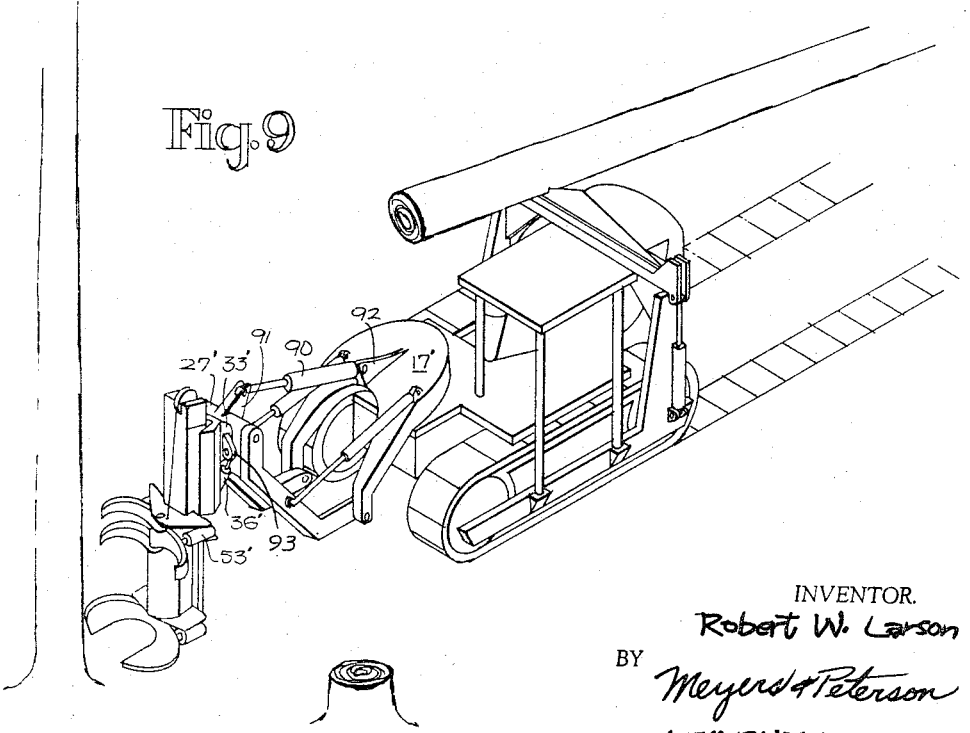
FIGURE 9 is a perspective view of a slightly different embodiment of the present invention.

FIGURE 9 illustrates another embodiment of this invention illustrating a manner of controlling the attitude of mast 40 by means of a single hydraulic cylinder-piston unit 90 which is mounted to suitable brackets 91 and 92, which are provided, respectively to the backing plate 27' and to the yoke unit 71'. Also in this embodiment, the rotational attitude of mast 40 is effected by means of a hydraulic cylinder-piston unit 36' which is pivotally connected to the sliding frame 43' and to a suitable ear 93 provided in lateral projecting relationship on pivot shaft 33'.

Although the invention has been described with reference to specific materials, embodiments and details, various modifications and changes, within the scope of this invention, will be apparent to one skilled in the art and are contemplated to be embraced within the invention.

What is claimed is:

1. A rack for supporting and transporting trees on a vehicle comprising a vertical blade means having a tree-penetrating edge at the top thereof mounted on said vehicle with its general plane disposed transversely of said vehicle, said blade means being adapted to support the ends of trees placed thereon, a transverse cradle frame mounted on said vehicle for cooperative co-action with said blade means, said cradle frame being adapted to laterally confine trees loaded on said blade means, and motor means for effecting relative movement between said cradle frame and said blade means to produce retraction and extension of said cradle frame relative to said blade means so that said trees are supported by said cradle frame upon extension of said cradle frame.

2. A tree-supporting rack as defined in claim 1 wherein said tree-penetrating edge comprises two inwardly and upwardly extending edge portions converging to a central apex at the top.

3. A tree-supporting rack as defined in claim 1 wherein said cradle frame has a transverse slot, said blade means being slidably movable in said slot.

4. A tree-supporting rack as defined in claim 1 wherein said blade means is fixedly mounted on said vehicle, said cradle frame being movable with respect thereto.

5. A tree-supporting rack as defined in claim 4 wherein said cradle frame has a transverse slot, said blade means being disposed in said slot.

6. A tree-supporting rack as defined in claim 5 wherein said tree-penetrating edge comprises two inwardly and upwardly extending edge portions converging to a central apex at the top.

7. A tree-supporting rack as defined in claim 6 further comprising means secured to each side of said vehicle for rigidly supporting said blade means, said motor means including extensible and retractable motors for movably mounting said cradle frame on said supporting means.

8. A tree-supporting rack as defined in claim 7, wherein said extensible and retractable motors are each pivotally connected to said supporting means and to the respective adjacent lateral ends of said cradle frame whereby a selected one of said motors may be extended to tilt said cradle frame about the axis of the pivotal connection of the other of said motors to unload said trees to either side of said vehicle.

9. A tree-supporting rack as defined in claim 8, said cradle frame including a pair of vertically disposed uprights for laterally confining said trees on said blade means.

10. A tree-supporting rack as defined in claim 9, said cradle frame being tiltable in either direction to a maximum tilt angle above the horizontal, said uprights having inclined inner surfaces thereon for contacting said trees to provide the lateral confinement thereof, said inner surfaces normally being inclined at an angle to the horizontal which is less than said maximum tilt angle whereby upon tilting of said cradle frame, said surfaces may be disposed at an angle below the horizontal for gravity unloading of said trees from said rack.

References Cited

UNITED STATES PATENTS

| | | | |
|---|---|---|---|
| 1,793,545 | 2/1931 | Rocher | 214—3 X |
| 2,746,629 | 5/1956 | Sandland. | |

FOREIGN PATENTS

| | | |
|---|---|---|
| 187,462 | 1/1964 | Sweden. |

GERALD M. FORLENZA, *Primary Examiner.*

ALBERT J. MAKAY, *Assistant Examiner.*